United States Patent
Schmidt et al.

(10) Patent No.: US 7,359,460 B2
(45) Date of Patent: Apr. 15, 2008

(54) COHERENT AND NON-COHERENT DATA PATH SPLITTING IN RECEIVERS FOR IMPROVED SYNCHRONIZATION

(75) Inventors: Michael Schmidt, Dresden (DE); Eric Sachse, Dresden (DE); Thomas Hanusch, Coswig (DE)

(73) Assignee: Advanced Micro Devices, Inc., Sunnyvale, CA (US)

( * ) Notice: Subject to any disclaimer, the term of this patent is extended or adjusted under 35 U.S.C. 154(b) by 782 days.

(21) Appl. No.: 10/464,988

(22) Filed: Jun. 19, 2003

(65) Prior Publication Data

US 2004/0086066 A1 May 6, 2004

(30) Foreign Application Priority Data

Nov. 4, 2002 (DE) ................. 102 51 309

(51) Int. Cl.
*H04L 27/14* (2006.01)
(52) U.S. Cl. ............... 375/324; 375/325; 375/371
(58) Field of Classification Search ........... 375/340, 375/316, 325, 324, 322, 371
See application file for complete search history.

(56) References Cited

U.S. PATENT DOCUMENTS

| | | | |
|---|---|---|---|
| 5,128,626 A * | 7/1992 | Iwasaki | 329/307 |
| 5,296,820 A * | 3/1994 | Kawabata | 329/307 |
| 5,903,556 A | 5/1999 | Matui | |
| 5,982,807 A | 11/1999 | Snell | |
| 6,549,583 B2 | 4/2003 | Crawford | |

* cited by examiner

*Primary Examiner*—Temesghen Ghebretinsae
(74) *Attorney, Agent, or Firm*—Meyertons Hood Kivlin Kowert & Goetzel, P.C.; Erik A. Heter

(57) ABSTRACT

An improved data communication receiver technique is provided which avoids demodulation errors due to abrupt phase changes. A receiver is provided for processing an incoming digitized signal. The receiver comprises a pre-processing portion, a phase error correction unit and a signal evaluation unit. The pre-processing portion is adapted to process the digitized signal for providing a non-coherent pre-processed signal. The phase error correction unit is adapted to correct a phase error of the non-coherent pre-processed signal and output a coherent signal. The signal evaluation unit is adapted to extract information from the non-coherent pre-processed signal and to output a data signal representing the extracted information. The phase error correction unit and said signal evaluation unit are configured to operate simultaneously for a predetermined time.

23 Claims, 4 Drawing Sheets

US 7,359,460 B2

COHERENT AND NON-COHERENT DATA PATH SPLITTING IN RECEIVERS FOR IMPROVED SYNCHRONIZATION

BACKGROUND OF THE INVENTION

1. Field of the Invention

The invention generally relates to data communication systems such as WLAN (Wireless Local Area Network) systems, and in particular to phase error corrected receivers in such systems.

2. Description of the Related Art

A wireless local area network is a flexible data communications system implemented as an extension to or as an alternative for, a wired LAN. Using radio frequency or infrared technology, WLAN systems transmit and receive data over the air, minimising the need for wired connections. Thus, WLAN systems combine data connectivity with user mobility.

Today, most WLAN systems use spread spectrum technology, a wide-band radio frequency technique developed for use in reliable and secure communication systems. The spread spectrum technology is designed to trade-off bandwidth efficiency for reliability, integrity and security. Two types of spread spectrum radio systems are frequently used: frequency hopping and direct sequence systems.

The standard defining and governing wireless local area networks that operate in the 2.4 GHz spectrum, is the IEEE 802.11 standard. To allow higher data rate transmissions, the standard was extended to 802.1 b that allows data rates of 5.5 and 11 Mbps in the 2.4 GHz spectrum. This extension is backwards compatible.

In particular, the 802.11b standard is specified for non-coherent receivers. However, the receiver sensitivity can be increased when using a coherent receiver which however requires sufficient phase error correction. Differential demodulation for differentially modulated signals as defined in the 802.11b standard is insensitive to a constant phase offset but will be heavily effected by an abrupt change in phase. Abrupt phase changes are typically produced when performing phase correction by means of an equalizer.

An example of a common arrangement in a wireless LAN receiver is illustrated in FIG. 1. A timing error and frequency error correction unit 102 receives a digitized baseband signal as an input and provides a timing error corrected and frequency error corrected output signal to an equalization unit 103. The equalization unit 103 performs a phase error correction. The finally output coherent signal of the equalization unit 103 however includes a phase shift at a certain point in time and thus becomes difficult to be correctly differentially demodulated.

SUMMARY OF THE INVENTION

An improved data communication receiver technique is provided which may avoid demodulation errors due to abrupt phase changes.

In one embodiment, a WLAN receiver is provided for processing an incoming digitized signal. The WLAN receiver comprises a pre-processing portion, a phase error correction unit and a signal evaluation unit. The pre-processing portion is adapted to process the digitized signal for providing a non-coherent pre-processed signal. The phase error correction unit is adapted to correct a phase error of the non-coherent pre-processed signal and output a coherent signal. The signal evaluation unit is adapted to extract information from the non-coherent pre-processed signal and to output a data signal representing the extracted information. The phase error correction unit and said signal evaluation unit are configured to operate simultaneously for a predetermined time.

In a further embodiment a baseband processing unit is provided for processing an incoming digitized baseband signal. The baseband processing device comprises a pre-processing portion, a phase error correction unit and a signal evaluation unit. The pre-processing portion is adapted to process the digitized signal for providing a non-coherent pre-processed signal. The phase error correction unit is adapted to correct a phase error of the non-coherent pre-processed signal and output a coherent signal. The signal evaluation unit is adapted to extract information from the non-coherent pre-processed signal and to output a data signal representing the extracted information. The phase error correction unit and said signal evaluation unit are configured to operate simultaneously for a predetermined time.

In another embodiment, there may be provided a data communication receiver for processing an incoming digitized differentially modulated signal. The data communication receiver comprises a pre-processing portion, a phase error correction unit and a signal evaluation unit. The pre-processing portion is adapted to process the digitized signal for providing a non-coherent pre-processed signal. The phase error correction unit is adapted to correct a phase error of the non-coherent pre-processed signal and output a coherent signal. The signal evaluation unit is adapted to extract information from the non-coherent pre-processed signal and to output a data signal representing the extracted information. The phase error correction unit and said signal evaluation unit are configured to operate simultaneously for a predetermined time.

In a further embodiment, an integrated circuit chip for processing an incoming digitized signal is provided. The integrated circuit chip comprises a pre-processing circuit, a phase error correction circuit and a signal evaluation circuit. The pre-processing circuit is adapted to process the digitized signal for providing a non-coherent pre-processed signal. The phase error correction circuit is adapted to correct a phase error of the non-coherent pre-processed signal and output a coherent signal. The signal evaluation circuit is adapted to extract information from the non-coherent pre-processed signal and to output a data signal representing the extracted information. The phase error correction circuit and said signal evaluation circuit are configured to to operate simultaneously for a predetermined time.

In still a further embodiment a method is provided for processing a digitized signal of a WLAN (Wireless Local Area Network) system. The digitized signal is preprocesses for providing a non-coherent pre-processed signal. The pre-processed non-coherent signal is phase error corrected for providing a coherent signal. Furthermore, information is extracted from the non-coherent pre-processed signal for providing a data signal representing the extracted information. The steps of phase error correcting the non-coherently pre-processed signal and extracting information therefrom are at least partly performed simultaneously.

Generally, these techniques perform a detection of non-coherent signals and a phase error correction of the non-coherent signals in parallel to each other. Thereby, the SFD and header portion of the received signal can be correctly processed based on the non-coherent signals. At the same time the phase error correction is performed for subsequently using the coherent signal to determine the payload data of the received signal. In particular, these techniques allow sufficient time to perform initial timing offset correction, frequency offset correction, channel estimation and DFE filter computation prior to the phase error correction even for the case of PCLP (Physical Layer Convergence Protocol) frames with a short preamble.

BRIEF DESCRIPTION OF THE DRAWINGS

The accompanying drawings are incorporated into and form the part of the specification for the purpose of explaining the principles of the invention. The drawings are not to be construed as limiting the invention to only the illustrated and described examples of how the invention can be made and used. Further features and advantageous will become apparent from the following and more particular description of the invention, as illustrated in the accompanying drawings, wherein.

DETAILED DESCRIPTION OF THE INVENTION

The illustrative embodiments of the present invention will be described with reference to the drawings.

The basic concept of the embodiments will now be described with reference to FIGS. 3 to 5. A more detailed description of the corresponding baseband processing in a WLAN receiver is then given with reference to FIG. 2.

Figure 1:
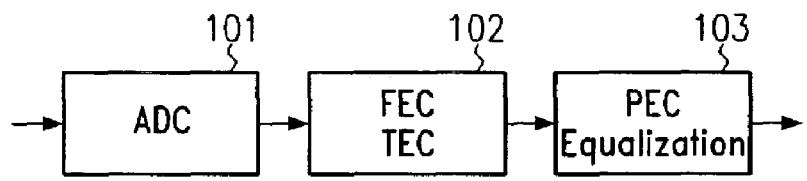
FIG. 1 is a schematic block diagram illustrating basic components of a conventional baseband processing unit in a wireless LAN receiver.
Figure 3:
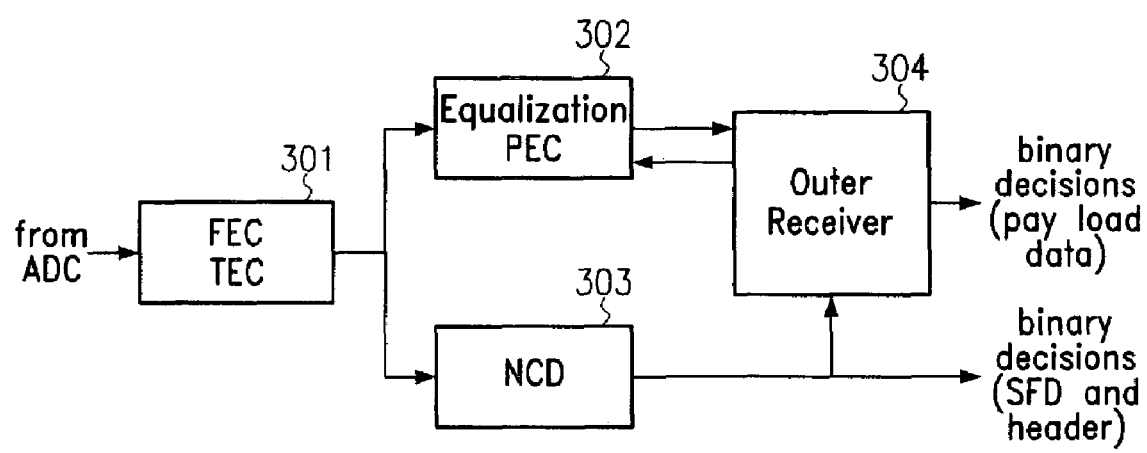
FIG. 3 illustrates a further embodiment of a baseband processor.

Thus, turning now to FIG. 3 which illustrates the basic components of a wireless LAN receiver comprising an outer receiver 304 and a baseband processing section including a pre-processing unit 301, a phase error correction unit 302 and a signal evaluation unit 303.

A digitized signal is provided from an analog-to-digital converter (ADC) and input to the pre-processing unit 301. The pre-processing unit 301 processes the digitized signal and provides a non-coherent pre-processed signal as an output. The pre-processing unit may perform a frequency error correction for correcting the frequency offset of the digitized signal and a timing error correction for correcting the timing offset and drift of the digitized signal.

The pre-processed base band signal is split into two branches. The non-coherent pre-processed signal is provided in parallel to the phase error correction unit 302 and the signal evaluation unit 303.

In the first branch the signal is equalized and phase error corrected. In more detail, the phase error correction unit corrects a phase error of the non-coherent pre-processed signal in order to output a coherent signal.

The phase error correction unit 302 or first branch further comprises an equalization unit. Once the equalizer has been set up and the frequency offset has been nearly compensated, the phase can be determined and immediately corrected. This allows for a transition from non-coherent to coherent detection.

The output signal provided by the phase error correction unit 302 is passed to an outer receiver 304 which decodes binary decisions for the pay load data of the 802.11b frame. The outer receiver 304 additionally provides a soft decision feedback signal to the phase error correction unit 302 to provide for a stable phase tracking.

In order to extend the time for equalizer training and synchronization an additional branch where no transition from non-coherent to coherent detection takes place and which will consequently not be effected by any phase jump is provided by means of the signal evaluation unit 303.

The second branch of the pre-processed digitized base band signal is non-coherently detected in the signal evaluation unit 303. The signal evaluation unit extracts information from the non-coherent pre-processed signal and outputs a data signal representing the extracted information. In particular, this output data signal comprises the extracted information in regard to the SFD and the header of the 802.11b frame. The output signal of the signal evaluation unit 303 may be used to control the outer receiver.

Since the processing in the second branch is not affected by phase jump, a transition from non-coherent to coherent detection can be selected at a suitable time. The phase shift due to phase error correction may be selected to take place when processing the header of the received signal. This considerably relaxes the requirements for channel estimation (CES), computing equalizer settings (DFE filter computation) and frequency offset correction.

In the following, corresponding steps 50 to 56 of a baseband signal processing illustrated in FIG. 5 will be described.

The wireless LAN receiver receives a digitized baseband signal as an input in step 51. Subsequently, the received digitized signal is subjected to error correction 52. The correspondingly pre-processed or error corrected signal thereafter is subjected to non-coherent detection and phase error correction in parallel in step 53. The output signal of the non-coherent detection is used in step 54 for determining SFD and header information. The pay load data are determined based on the output signal of the phase error correction in step 55.

Figure 4:
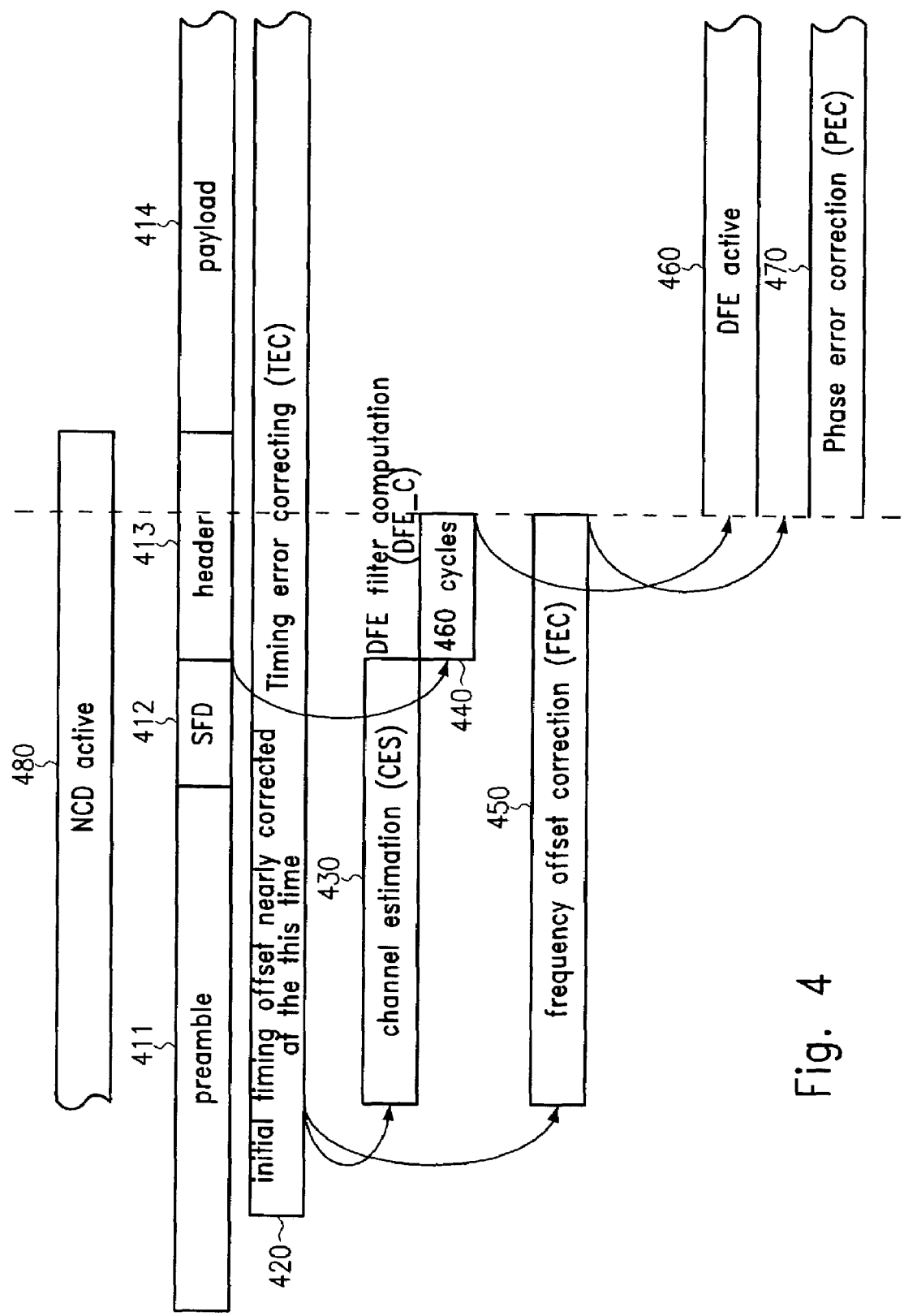
FIG. 4 is a timing diagram of the processing of a received data packet.
Figure 5:
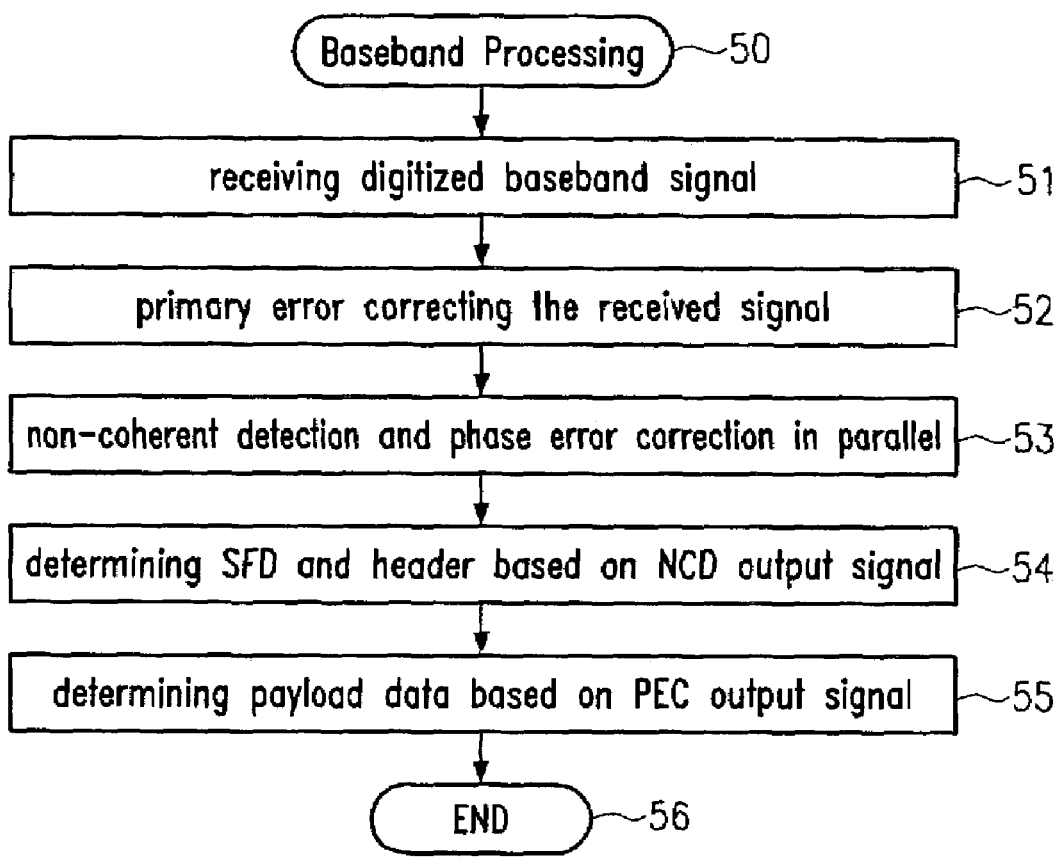
FIG. 5 is a flowchart of the baseband processing process.

As it becomes apparent from the timing diagram in FIG. 4, this allows to control the receiver in such a way, that the phase shift due to phase error correction takes place at the time of receiving the header information 413 from a received data packet 411 to 414.

For example, in the physical layer convergence protocol (PLCP) two types of frames are transmitted. A long PLCP frame comprises 128 synchronization bits in the preamble 411, whereas a short PLCP frame only comprises 56 synchronization bits in the preamble 411. A 16 bit field SFD 412 is used to mark the start of every frame. A PLCP Header 413 comprises a 8 bit signal or Data rate field indicating how fast the data will be transmitted, a 8 bit RFU Service field, 16 bit length field indicating the length of the ensuing MAC PDU and a 16 bit CRC (Cyclic Redundancy Code) field. In this case the MAC PDU forms the payload data 414.

The technique according to the embodiments is particularly required for short PLCP frames in order to allow a sufficient timing error correction 420, channel estimation 430, DFE filter computation 440 and/or frequency error correction 450, before decoding the pay load data.

When the initial timing offset is nearly corrected 420, the channel estimation 430 and the frequency offset correction 450 can be started. For example, within 460 operation cycles starting from the beginning of the header information, filter coefficients for the decision feedback equalizer are calculated. As previously indicated the phase error correction will cause a phase shift when the frequency error correction is finalized, as indicated by dotted lines in the diagram. Starting from this time the decision feedback equalizer becomes active 460 and the phase error correction 470 remains active.

At least until the phase shift takes place, but as well until the end of the header 413 the non-coherently detected output signal is used for determining the header information. The overlapping time between using a non-coherent signal after the event of the phase shift may be optimized, for example in order to determine a remainder of the header information 413 by coherent detection.

Figure 2:
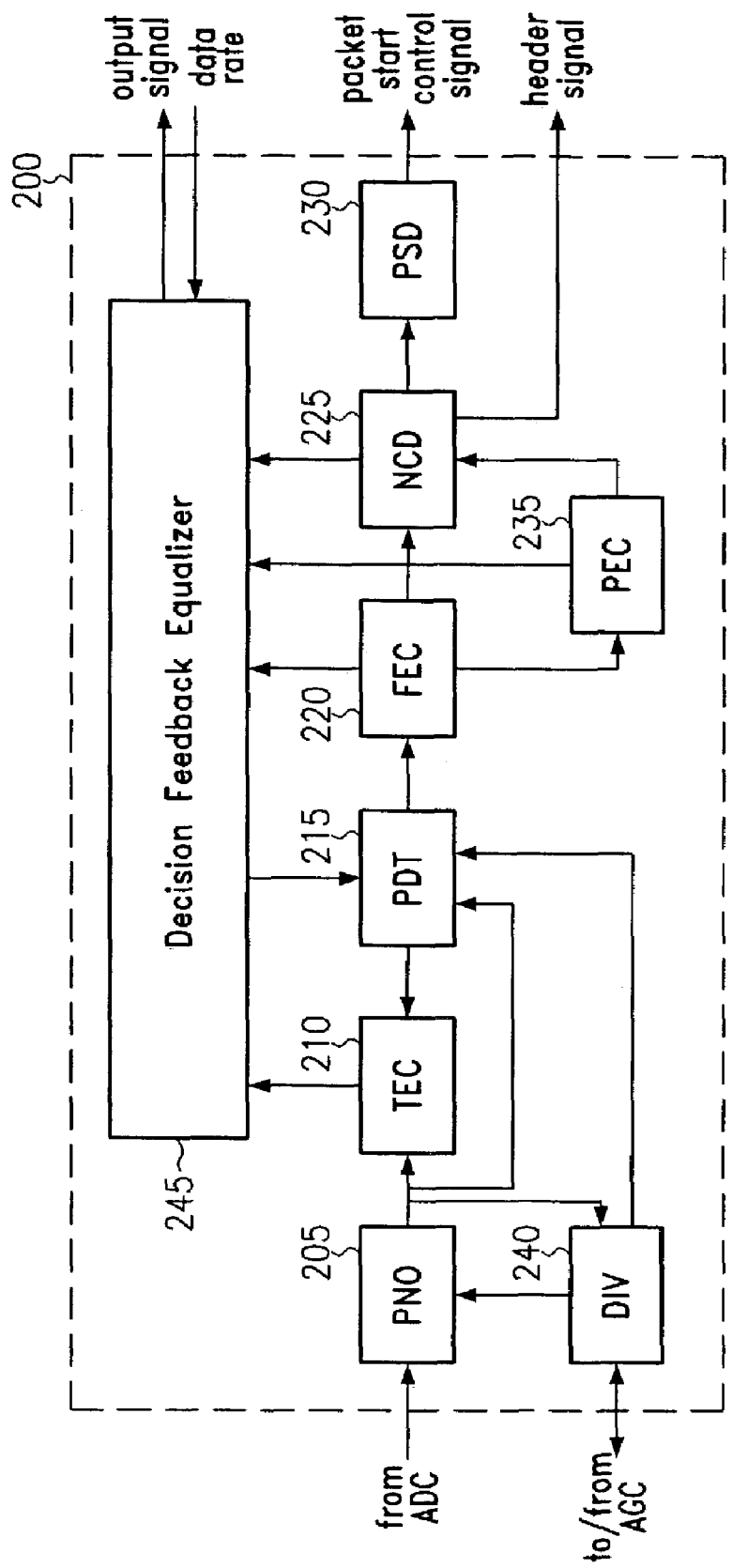
FIG. 2 illustrates the components of the baseband processor of the wireless LAN receiver according to an embodiment.

Referring now to FIG. 2 which illustrates the components of a WLAN receiver according to an embodiment, the receiver comprises a synchronization baseband part 200 that is connected to a radio frequency part. The radio frequency part may be an analog circuit that receives an analog signal and provides a digitized representation thereof to the baseband part 200. Moreover, the radio frequency part may perform an automatic gain control to control the amplification gain dependent on the received signal power or strength. The automatic gain controller is located in the analog radio frequency part and interchanges control signals with the digital circuitry of the baseband part 200.

The baseband part 200 of the WLAN receiver according to the embodiment shown in FIG. 2 comprises a number of units that are interconnected to form a data path. That is, the baseband part 200 receives the digitized input signal from the radio frequency part and generates output data that is to be demodulated, decoded and descrambled for further processing.

When receiving the digitized input signal in the baseband part 200, a power normalization is performed in a power normalization (PNO) unit 205. The power normalization may be performed under control of a diversity selection (DIV) unit 240 that controls the antenna diversity and which is connected to an automatic gain controller of the radio frequency part. For performing the diversity selection, the diversity selection unit 240 receives the normalized signal from the power normalization unit 205.

The diversity selection unit 240 may further provide a control signal to a preamble detection (PDT) unit 215. The preamble detection unit 215 receives the normalized signal from the power normalization unit 205 and detects a preamble in this signal. A preamble is a special signal pattern used for synchronization acquisition.

As may be seen from FIG. 2, the preamble detection unit 215 provides output signals to a timing error correction (TEC) unit 210 and a frequency error correction (FEC) unit 220. These units are used to detect and correct timing errors and frequency errors, respectively.

Further, there is provided a packet start detection (PSD) unit 230 that detects the start of frame delimiter (SFD) portion in the received data signal to generate a packet start control signal. For this purpose, the packet start detection unit 230 receives input from a non-coherent detection unit 225.

In addition, a decision feedback equalizer 245 is provided that receives the output signal of the timing error correction unit 210 and filters this signal. The decision feedback equalizer 245 may operate dependent on certain input signals that are received from the frequency error correction unit 220, the phase error correction unit 235 and/or the non-coherent detection (NCD) unit 225. Moreover, the decision feedback equalizer 245 may receive a signal which is indicative of the data rate.

In particular, the NCD unit 225 receives a frequency error corrected signal from the FEC unit 220 in order to non-coherently detect the SFD and the header information. An output of the NCD unit 225 is provided to the DFE 245, but furthermore to the PSD 230. Optionally only, a header signal is separately provided as an output signal.

In accordance with the principles described above with reference to FIGS. 3 to 5, the NCD unit 225 and the PEC unit 235 will operate in parallel in order to provide an output signal unaffected by a phase shift via the NCD unit 225 and to independently thereof correct the phase error of the FEC's 220 non-coherent output signal in the PEC unit 235.

While the invention has been described with respect to the physical embodiments constructed in accordance therewith, it will be apparent to those skilled in the art that various modifications, variations and improvements of the present invention may be made in the light of the above teachings and within the purview of the appended claims without departing from the spirit and intended scope of the invention. In addition, those areas in which it is believed that those of ordinary skill in the art are familiar, have not been described herein in order to not unnecessarily obscure the invention described herein. Accordingly, it is to be understood that the invention is not to be limited by the specific illustrative embodiments, but only by the scope of the appended claims.

What is claimed is:

1. A WLAN (Wireless Local Area Network) receiver for processing an incoming digitized signal, the WLAN receiver comprising:
   a pre-processing portion adapted to process the digitized signal for providing a non-coherent pre-processed signal;
   a phase error correction unit adapted to correct a phase error of the non-coherent pre-processed signal and to output a coherent signal;
   a signal evaluation unit adapted to extract information from the non-coherent pre-processed signal and to output a data signal representing the extracted information;
   wherein said phase error correction unit and said signal evaluation unit are configured to operate simultaneously for a predetermined time.

2. The WLAN receiver according to claim 1, wherein the phase error correction unit comprises an equalization unit.

3. The WLAN receiver according to claim 1, wherein the pre-processing portion comprises a frequency error correction unit for correcting the frequency offset of the digitized signal.

4. The WLAN receiver according to claim 1, wherein the pre-processing portion comprises a timing error correction unit for correcting the timing offset and drift of the digitized signal.

5. The WLAN receiver according claim 1, wherein the phase error correction performed in the phase error correction unit leads to a phase shift while header data are extracted in the signal evaluation unit.

6. The WLAN receiver according to claim 1, wherein the extracted information are SFD (Start Frame Delimiter) and header data.

7. The WLAN receiver according to claim 1, wherein the phase error correction unit is connected to an outer receiver receiving the coherent signal and providing an output signal representing the payload data of the incoming digitized signal.

8. The WLAN receiver according to claim 7, wherein the outer receiver provides a feedback signal to the phase error correction unit.

9. The WLAN receiver according to claim 1, wherein the receiver further comprises a decision feedback equalizer and is adapted to calculate filter coefficients for the decision feedback equalizer.

10. The WLAN receiver according to claim 1, wherein the receiver is adapted to perform a channel estimation.

11. The WLAN receiver according to claim 7, wherein the outer receiver is adapted to differentially demodulate the output signals of the phase error correction unit and the signal evaluation unit.

12. A baseband processing device for processing an incoming digitized baseband signal, the baseband processing device comprising:
a pre-processing portion adapted to process the digitized signal for providing a non-coherent pre-processed signal;
a phase error correction unit adapted to correct a phase error of the non-coherent pre-processed signal and to output a coherent signal;
a signal evaluation unit adapted to extract information from the non-coherent preprocessed signal and to output a data signal representing the extracted information;
wherein said phase error correction unit and said signal evaluation unit are configured to operate simultaneously for a predetermined time.

13. A data communication receiver for processing an incoming digitized differentially modulated signal, the data communication receiver comprising:
a pre-processing portion adapted to process the digitized signal for providing a non-coherent pre-processed signal;
a phase error correction unit adapted to correct a phase error of the non-coherent pre-processed signal and to output a coherent signal;
a signal evaluation unit adapted to extract information from the non-coherent pre- processed signal and to output a data signal representing the extracted information;
wherein said phase error correction unit and said signal evaluation unit are configured to operate simultaneously for a predetermined time.

14. An integrated circuit chip for processing an incoming digitized signal, the integrated circuit chip comprising:
a pre-processing circuit adapted to process the digitized signal for providing a non-coherent pre-processed signal;
a phase error correction circuit adapted to correct a phase error of the non- coherent pre-processed signal and to output a coherent signal;
a signal evaluation circuit adapted to extract information from the non-coherent pre-processed signal and to output a data signal representing the extracted information;
wherein said phase error correction circuit and said signal evaluation circuit are configured to operate simultaneously for a predetermined time.

15. A method for processing a digitized signal of a WLAN (Wireless Local Area Network) system, the method comprising:
pre-processing the digitized signal for providing a non-coherent pre-processed signal;
phase error correcting the pre-processed non-coherent signal for providing a coherent signal;
extracting information from the non-coherent pre-processed signal for providing a data signal representing the extracted information;
wherein the steps of phase error correcting the non-coherently pre-processed signal and extracting information therefrom are at least partly performed simultaneously.

16. The method according to claim 15, wherein the non-coherent pre-processed signal is further subjected to equalization 17. The method according to claim 15, wherein the step of pre-processing comprises to perform a frequency error correction for correcting a frequency offset of the digitized signal.

18. The method according to claim 15, wherein step of pre- processing further comprises to perform a timing error correction for correcting a timing offset and a drift of the digitized signal.

19. The method according claim 15, wherein the step of phase error correction leads to a phase shift in the output signal while the step of extracting information in parallel f extracts header data of the incoming signal.

20. The method according claim 15, wherein the extracted information are SFD (start frame delimiter) and header data.

21. The method according to claim 15, wherein the payload data are determined based on the coherent signal, whereas SFD and header data are determined based on the data signal.

22. The method according to claim 15, wherein filter coefficients for the decision feedback equalizer are calculated.

23. The method according to claim 15, wherein channel estimation is performed.

* * * * *